US008184885B2

(12) United States Patent
Ishikawa et al.

(10) Patent No.: US 8,184,885 B2
(45) Date of Patent: May 22, 2012

(54) SYSTEM AND METHOD FOR VISUALIZING A STRUCTURE OF INTEREST

(75) Inventors: Hiroshi Ishikawa, Allison Park, PA (US); Joel S. Schuman, Pittsburgh, PA (US); Gadi Wollstein, Pittsburgh, PA (US)

(73) Assignee: University of Pittsburgh - of the Commonwealth System of Higher Education, Pittsburgh, PA (US)

( * ) Notice: Subject to any disclaimer, the term of this patent is extended or adjusted under 35 U.S.C. 154(b) by 932 days.

(21) Appl. No.: 12/179,481

(22) Filed: Jul. 24, 2008

(65) Prior Publication Data
US 2009/0028400 A1   Jan. 29, 2009

Related U.S. Application Data

(60) Provisional application No. 60/951,488, filed on Jul. 24, 2007.

(51) Int. Cl.
*G06K 9/00* (2006.01)
(52) U.S. Cl. .................. 382/131; 382/154; 600/437
(58) Field of Classification Search .................. 382/128, 382/130, 131, 154
See application file for complete search history.

(56) References Cited

U.S. PATENT DOCUMENTS

| | | | |
|---|---|---|---|
| 4,920,573 A * | 4/1990 | Rhodes et al. ............... | 382/131 |
| 6,816,607 B2 | 11/2004 | O'Donnell et al. | |
| 7,659,990 B2 | 2/2010 | Knighton et al. | |
| 2001/0031920 A1 * | 10/2001 | Kaufman et al. ............. | 600/431 |
| 2002/0015934 A1 * | 2/2002 | Rubbert et al. ............... | 433/29 |
| 2003/0227467 A1 | 12/2003 | Hara | |

OTHER PUBLICATIONS

Ishikawa, H. et al., "Macular Segmentation with Optical Coherence Tomography," Investigative Ophthalmology & Visual Science, vol. 46, No. 6, Jun. 2005, pp. 2012-2017.
Cucu RG, et al., "Combined Confocal/En Face T-Scan-Based Ultrahigh-Resolution Optical Coherence Tomography in vivo Retinal Imaging," Opt. Lett. vol. 31, No. 11, Jun. 1, 2006, pp. 1684-1686.
Alam, S. et al., "Clinical Application of Rapid Serial Fourier-Domain Optical Coherence Tomography for Macular Imaging," Ophthalmology, vol. 113, No. 8, Epub Jun. 12, 2006, pp. 1425-1431.
Haeker, M. et al., "Use of Varying Constraints in Optimal 3-D Graph Search for Segmentation of Macular Optical Coherence Tomography Images," Med Image Comput Assist Interv, vol. 10, Part 1, 2007, pp. 244-251.
Haeker M., et al., "Incorporation of Regional Information in Optimal 3-D Graph Search With Application for Intraretinal Layer Segmentation of Optical Coherence Tomography Images," INF Process Med Imaging, vol. 20, 2007, pp. 607-618.
Haeker M., et al., "Segmentation of the Surfaces of the Retinal Layer from OCT Images," Med Image Comput Assist Interv, vol. 9, Part 1, 2006, pp. 800-807.

* cited by examiner

*Primary Examiner* — Vu Le
*Assistant Examiner* — Michael Vanchy, Jr.
(74) *Attorney, Agent, or Firm* — Reed Smith LLP

(57) ABSTRACT

A system. The system includes a computing device configured for communication with an imaging system and with a display device. The computing device includes a contour modeling module. The contour modeling module is configured for superimposing reference anchors on a cross-sectional image generated from 3D image data, for generating a line which connects the reference anchors, for sampling the 3D image data in a variable thickness plane defined by the connecting line, and for generating a contour-modeled C-mode image from the sampled 3D image data.

17 Claims, 16 Drawing Sheets

SYSTEM AND METHOD FOR VISUALIZING A STRUCTURE OF INTEREST

CROSS-REFERENCE TO RELATED APPLICATION

This application claims the benefit under 35 U.S.C. §119(e) of the earlier filing date of U.S. Patent Application No. 60/951,488 filed on Jul. 24, 2007.

STATEMENT REGARDING FEDERALLY SPONSORED RESEARCH

This invention was made with United States Government support in the form of Grant Numbers R01-EY013178-07, R01-EY013516-04, and R01-EY011289-20 from the National Institutes of Health. The United States Government may have certain rights in the invention.

BACKGROUND

This application discloses an invention which is related, generally and in various embodiments, to a system and method for visualizing a structure of interest.

Medical imaging has long played a critical role in diagnosing and assessing various pathologies. Especially during the last decade, along with a rapid evolution of computer technologies, many new imaging modalities providing three-dimensional (3D) image datasets have been introduced and proven to be clinically useful. This broad spectrum of 3D image modalities is used to image a wide variety of internal features of patients.

One of the advantages of 3D image datasets, when compared to previous two dimensional (2D) datasets, is the flexible image visualization capability with which 3D datasets are characterized. Specifically, when utilizing a full 3D dataset, an operator can mathematically "slice" the target tissue along any arbitrary plane or other surface. This flexibility allows clinicians to observe pathologies from the exact point (or points) of view that are most useful for a given clinical situation.

One commonly employed imaging modality, optical coherence tomography (OCT), is a non-invasive, interferometric imaging modality that provides millimeter penetration at micrometer-scale axial and lateral resolution. OCT is particularly adaptable to opthalmologic applications. First generation OCT techniques provided 2D cross-sectional views of human retinas at a microscopic resolution (~10 μm) in vivo. Due to its non-contact, non-invasive scanning, OCT quickly became an indispensable clinical test for retinal abnormalities including the leading causes of blindness: age-related macular degeneration, diabetic retinopathy, and glaucoma.

Spectral domain optical coherence tomography (SD-OCT) has gained increased utilization in opthalmologic applications. Compared to first generation OCT techniques, SD-OCT scans 60 times faster with a resolution (~5 μm) that is twice as fine. With its fast scanning, SD-OCT allows 3D image dataset acquisition in a reasonably short period of time (e.g., approximately 1.5 seconds).

In conventional OCT techniques, when the eye is scanned, raw data (i.e., 3D OCT data) corresponding to the structure of the eye is captured. The raw data is subsequently processed into 3D image data (e.g., universal time-domain intensity data), from which various images associated with the eye can be generated. Such images include an OCT fundus image (FIG. 1), a conventional C-mode image (FIG. 2), a horizontal (x-z) cross-sectional image (FIG. 3), and a vertical (y-z) cross-sectional image (FIG. 4).

The natural spherical curvature of the eye (as well as certain other target structures) presents unique problems for opthalmologic applications of OCT, including applications of SD-OCT. Conventional C-mode images along the planes perpendicular to the scanning axis can provide an interesting perspective. However, due to the natural spherical curvature of the eye, and to various layered structures within the eye (e.g., retinal layers, choroid, etc.), a conventional C-mode image associated with an eye often includes multiple different structures, thereby making the conventional C-mode images very difficult to accurately interpret, even by a highly trained ophthalmologist.

Additionally, the natural spherical curvature of the eye is not the only source of artifactual distortion when attempting these types of image dataset acquisitions. Certain target structures, such as the eye, often experience rapid and involuntary movement. Such movement often distorts the raw data, which in turn distorts the 3D image data. When a conventional C-mode image is generated from the distorted 3D image data, the conventional C-mode image is very difficult to accurately interpret, even by a highly trained ophthalmologist.

Although a given conventional C-mode image may appear to be satisfactory for accurate interpretation, an associated cross-sectional image (e.g., a horizontal cross-sectional image, a vertical cross-sectional image, etc.) may show that the 3D image data utilized to generate the conventional C-mode image is distorted. For example, FIG. 5 shows four images generated from the same 3D image data set. The image in the upper left is a conventional C-mode image, the image in the upper right is a horizontal cross-sectional image, the image in the lower right is a vertical cross-sectional image, and the image in the lower left is the same conventional C-mode image as the one in the upper left. Even though the conventional C-mode images and the horizontal cross-sectional image appear to be satisfactory, the fair amount of eye movement shown in the vertical cross-sectional image indicates that the 3D image data set used to generate the images was distorted.

One approach utilized to try to reduce the problems caused by the natural curvature of the eye and/or movement of the eye during the scan is segmentation. Segmentation algorithms operate to segment the 3D image data into segments, where each segment corresponds to a given structure of interest (e.g., the retinal pigment epithelium, the internal limiting membrane, etc.). After the structure of interest is identified, the 3D image data is sampled along the corresponding segment (which has an arbitrary thickness). The sampled 3D image data is utilized to generate a "segmented" C-mode image which only contains structures from the same segment. In general, the segmented C-mode images provide more accurate visualization than conventional C-mode images. However, it is well known that segmentation algorithms frequently fail to detect proper structures, especially in cases where retinal pathologies are present, leading to the poor quality segmented C-mode images.

SUMMARY

In one general respect, this application discloses a system for visualizing a structure of interest. According to various embodiments, the system includes a computing device configured for communication with an imaging system and with a display device. The computing device includes a contour modeling module. The contour modeling module is configured for superimposing reference anchors on a cross-sectional image generated from 3D image data, for generating a line which connects the reference anchors, for sampling the 3D image data in a variable thickness plane defined by the connecting line, and for generating a contour-modeled C-mode image from the sampled 3D image data.

In another general respect, this application discloses a method for visualizing a structure of interest. According to various embodiments, the method is implemented at least in part by a computing device. The method includes superimposing reference anchors on a cross-sectional image generated from 3D image data, generating a line connecting the reference anchors, sampling the 3D image data in a variable thickness plane defined by the connecting line, and generating a contour-modeled C-mode image from the sampled 3D image data.

Aspects of the invention may be implemented by a computing device and/or a computer program stored on a computer-readable medium. The computer-readable medium may comprise a disk, a device, and/or a propagated signal.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

For purposes of simplicity, the invention will be described in the context of its use with a spectral domain optical coherence tomography (SD-OCT) system that generates three-dimensional image data associated with a human eye. However, it is understood that the invention may also be utilized with any of a wide variety of different imaging modalities to visualize any of a wide variety of different structures of interest.

Figure 1:
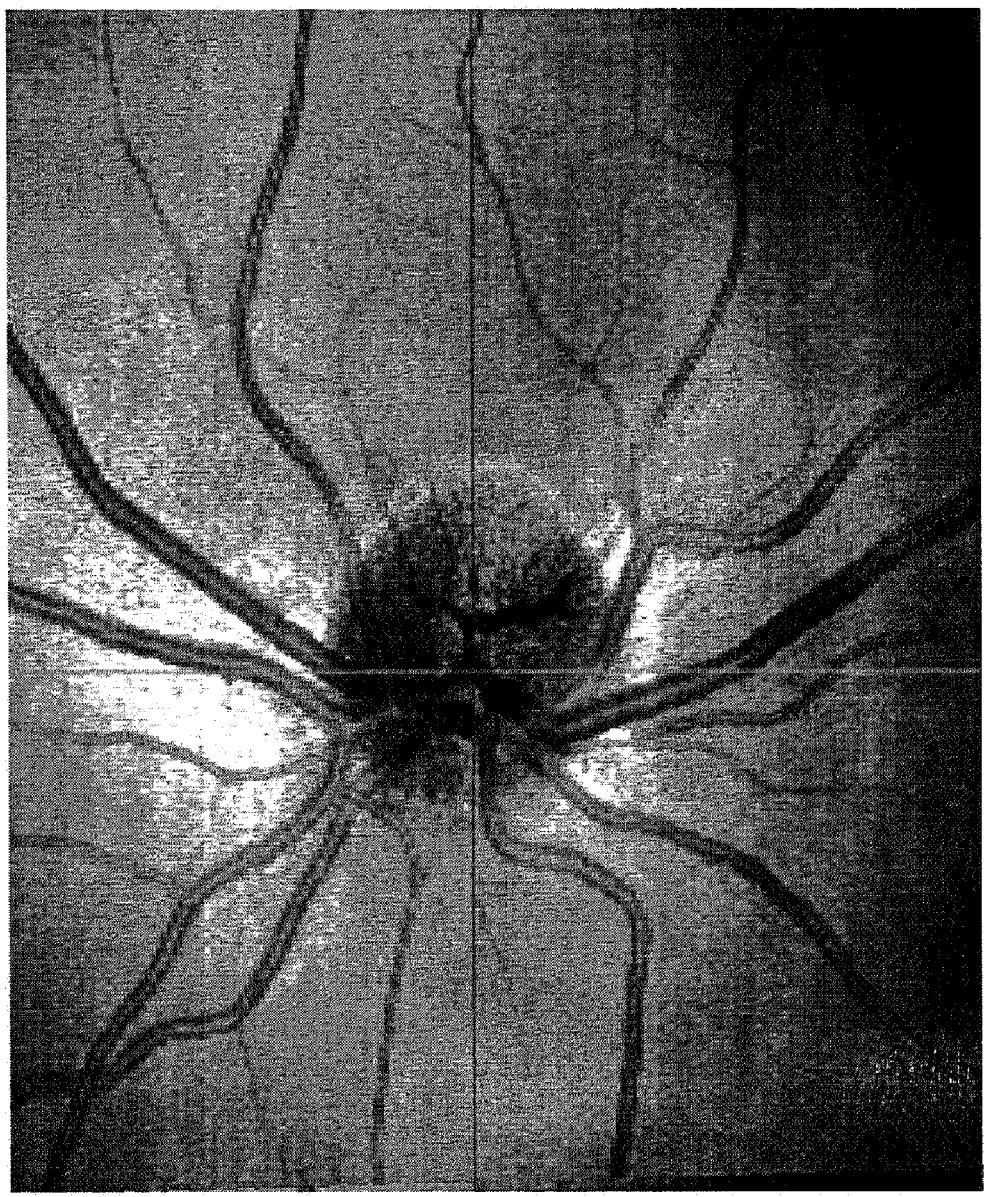
FIG. 1 is an example of an OCT fundus image generated from 3D image data.
Figure 2:
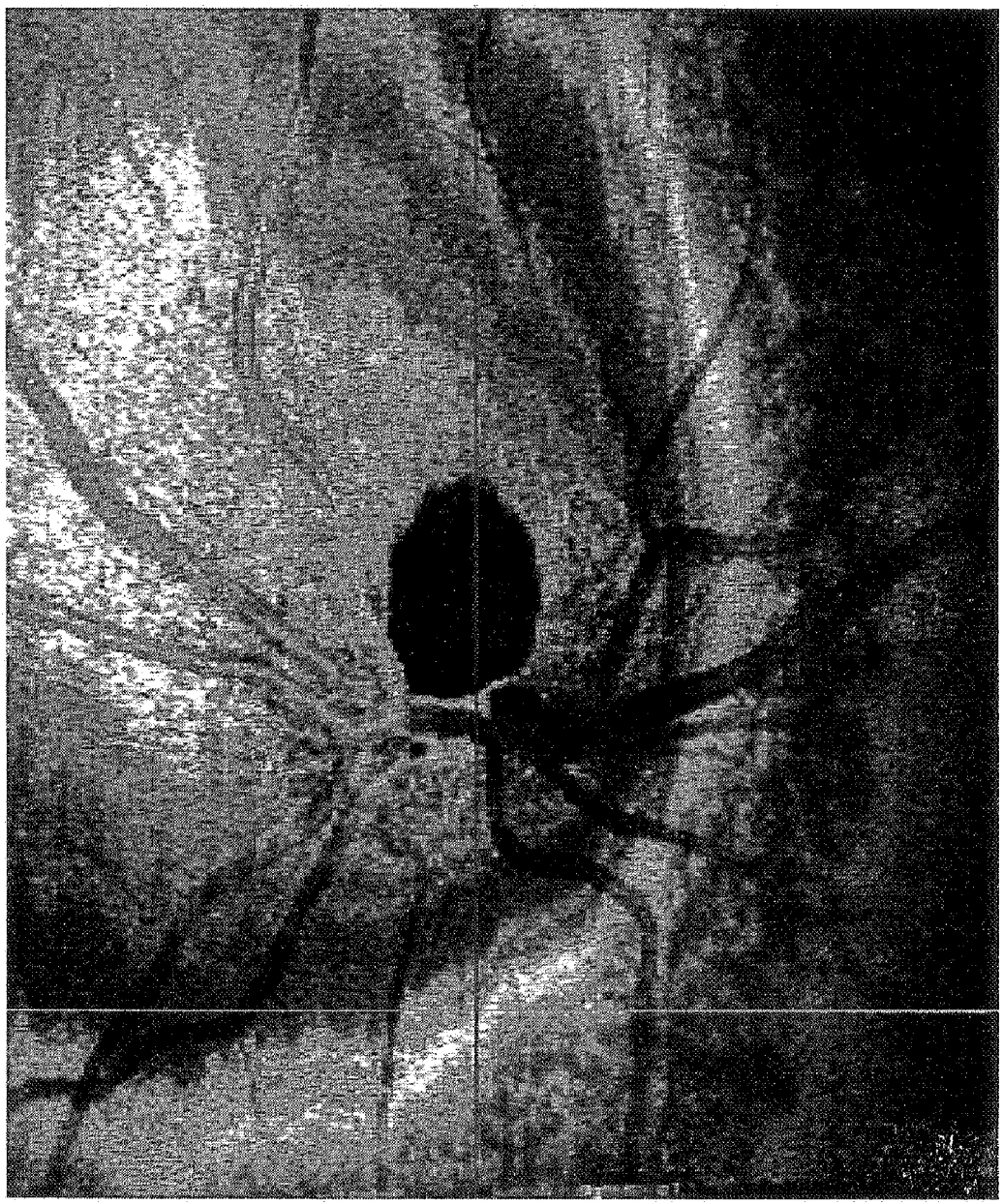
FIG. 2 is an example of a conventional C-mode image generated from 3D image data.
Figure 3:
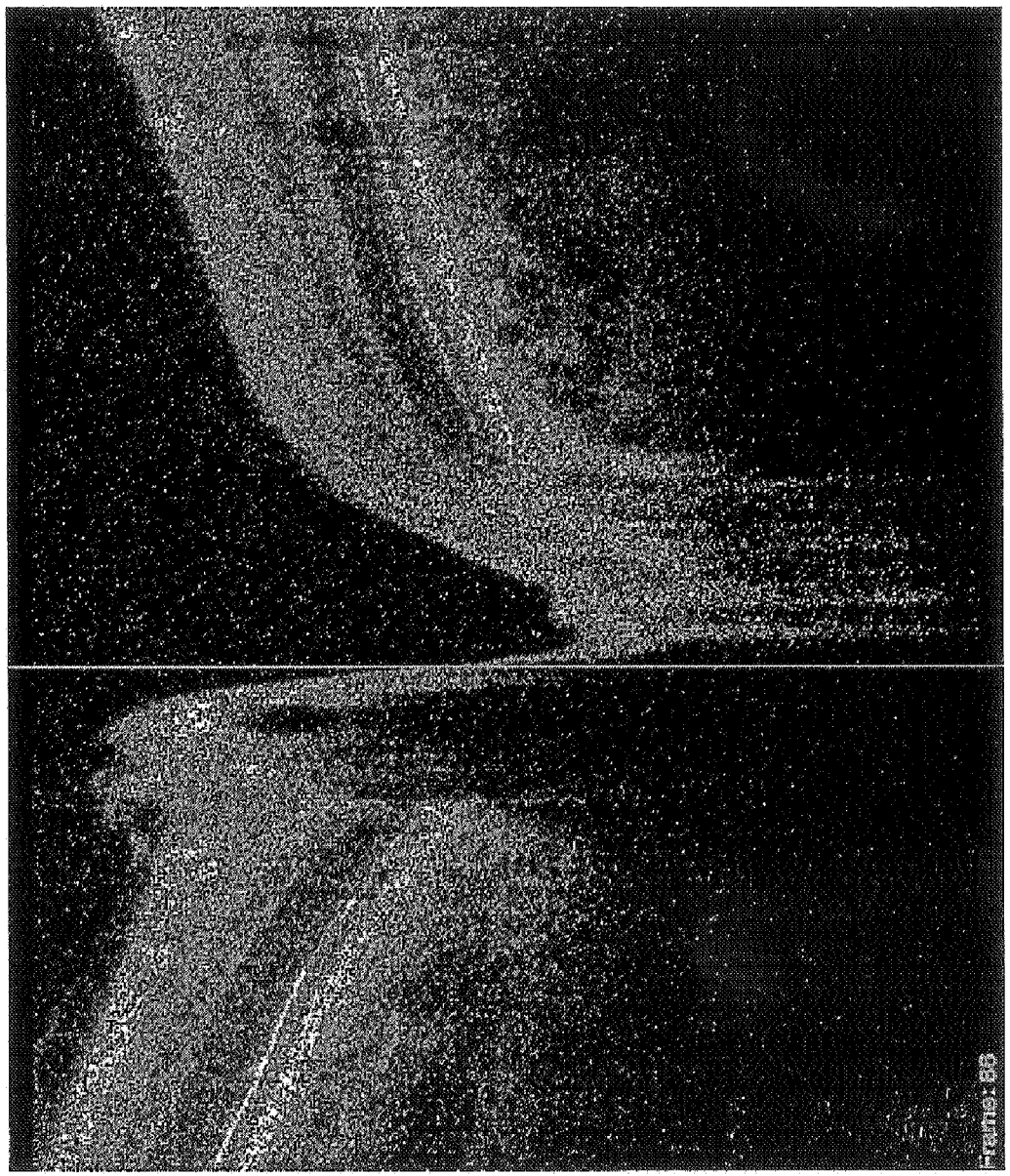
FIG. 3 is an example of a horizontal cross-sectional image generated from 3D image data.
Figure 4:
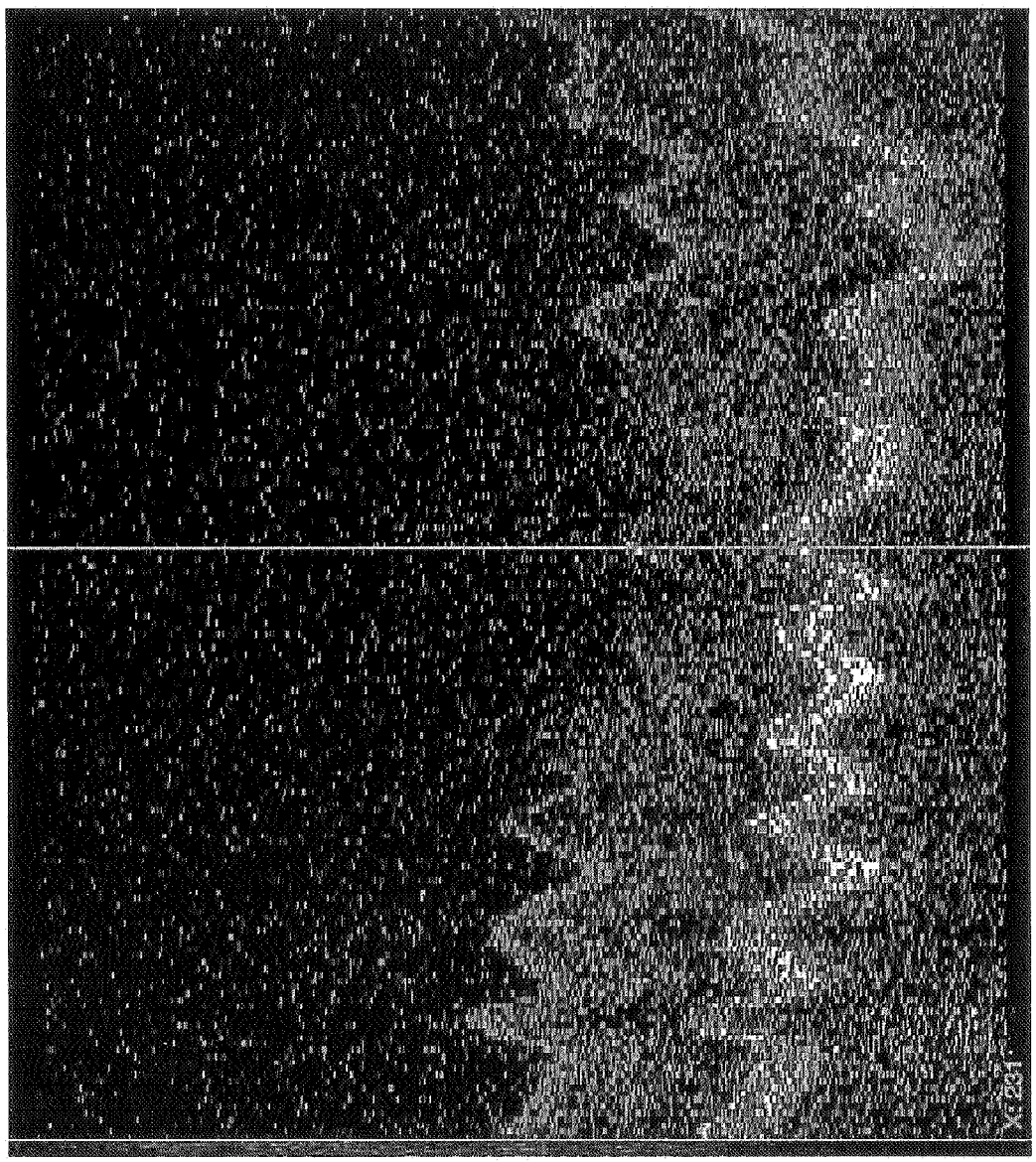
FIG. 4 is an example of a vertical cross-sectional image generated from 3D image data.
Figure 5:
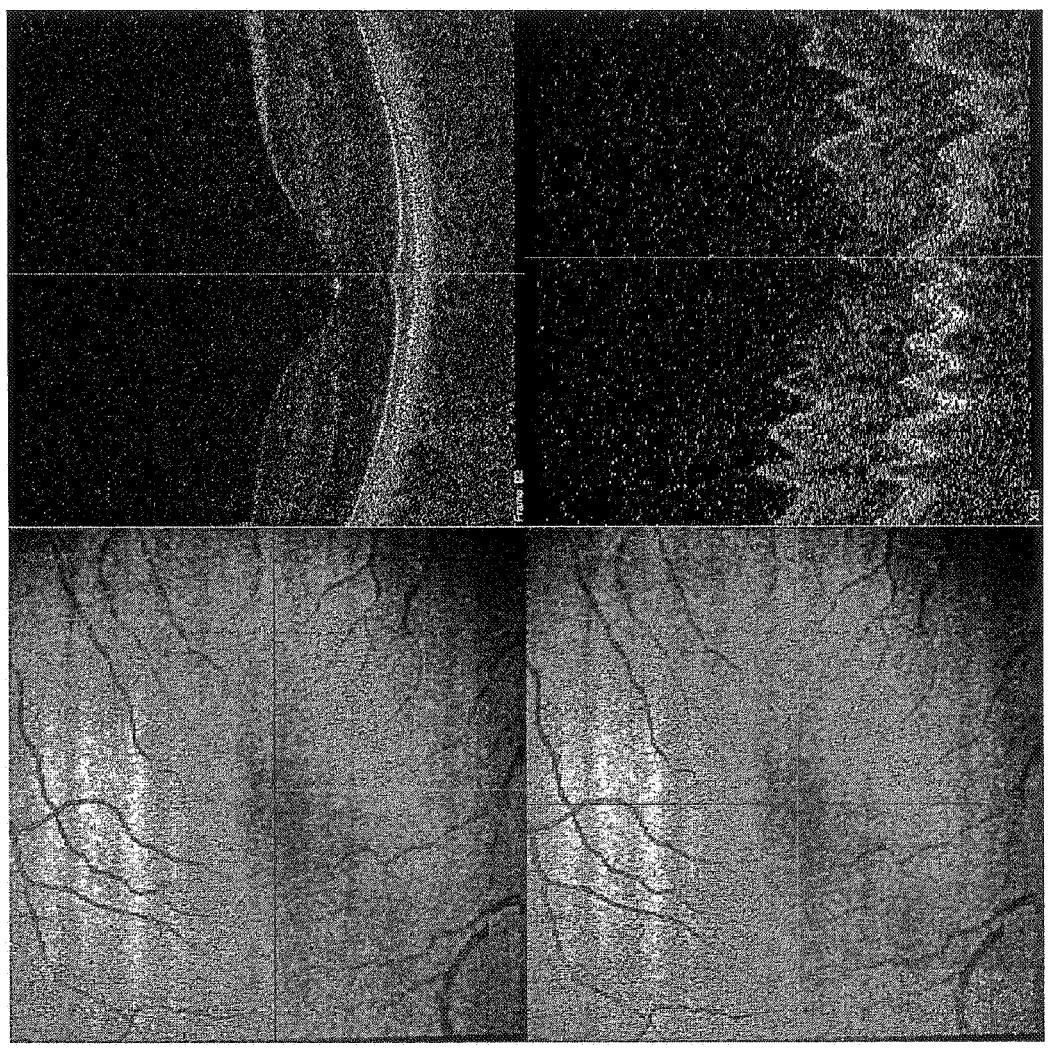
FIG. 5 shows several images generated from the same 3D image data.
Figure 6:
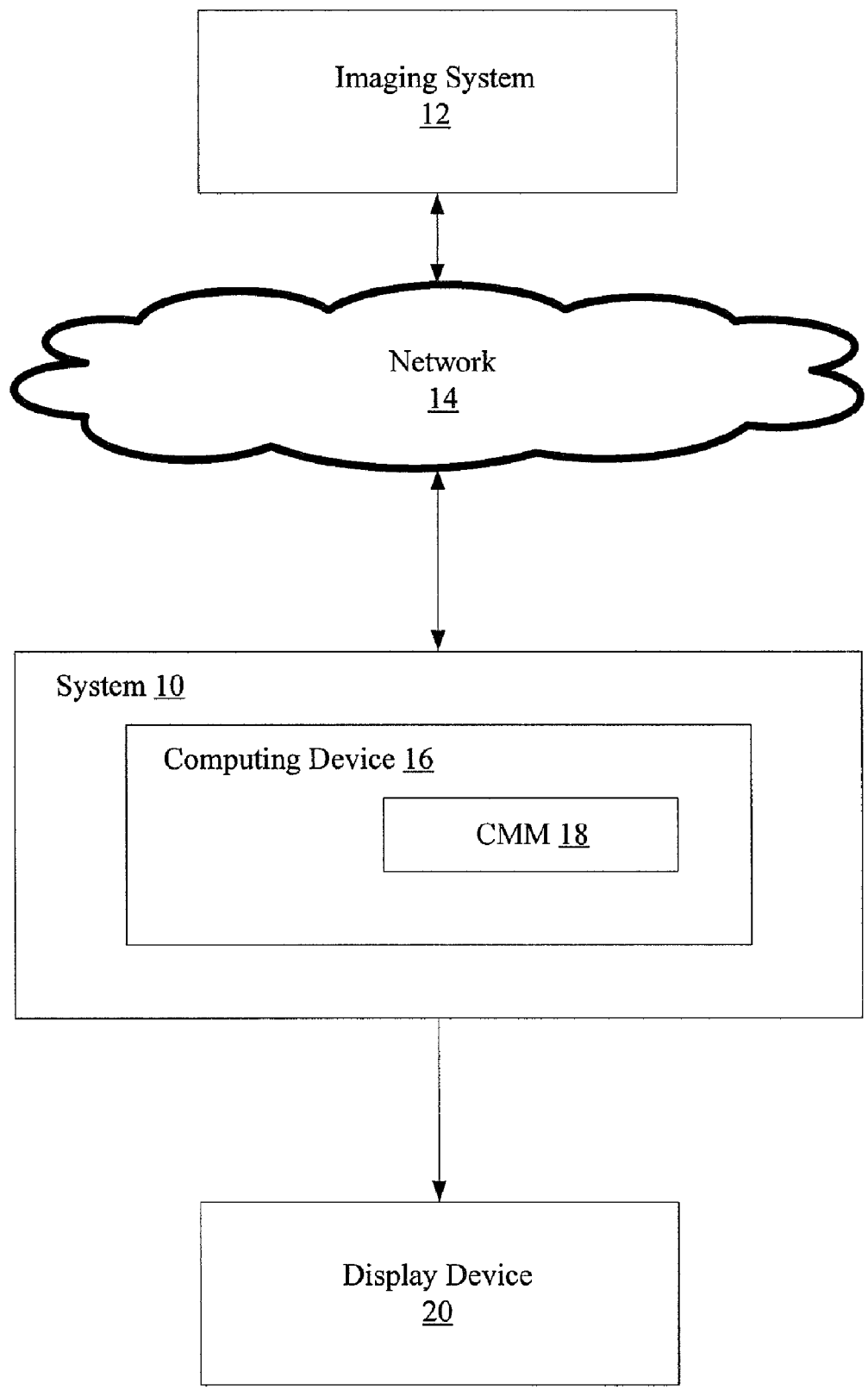
FIG. 6 illustrates various embodiments of a system for visualizing a structure of interest.

FIG. 6 illustrates various embodiments of a system 10 for visualizing a structure of interest. The system 10 is communicably connected to an imaging system 12. The system 10 may be connected to the imaging system 12 in any suitable manner. According to various embodiments, the system 10 is communicably connected to the imaging system 12 via a network 14 as shown in FIG. 6. According to other embodiments, the system 10 may form a portion of the imaging system 12.

The imaging system 12 is configured to generate raw data associated with a scanned target, to process the raw data into 3D image data, and in some embodiments, to generate images based on the 3D image data. The generated images may be, for example, an OCT fundus image, a conventional C-mode image, a horizontal (x-z) cross-sectional image, a vertical (y-z) cross-sectional image, etc.

The imaging system 12 may be embodied as any of a number of different types of imaging systems configured for generating three-dimensional image data. For example, according to various embodiments, the imaging system 12 may be an optical coherence tomography system (e.g., a spectral domain optical coherence tomography system), a magnetic resonance imaging system, etc. For purposes of simplicity, only one imaging system 12 is shown in FIG. 6. However, it is understood that the system 10 may be connected to any number of imaging systems 12.

In general, the system 10 and the imaging system 12 each include hardware and/or software components for communicating with the network 14 and with each other. The system 10 and the imaging system 12 may be structured and arranged to communicate through the network 14 via wired and/or wireless pathways using various communication protocols (e.g., HTTP, TCP/IP, UDP, WAP, WiFi, Bluetooth) and/or to operate within or in concert with one or more other communications systems.

The network 14 may include any type of delivery system including, but not limited to, a local area network (e.g., Ethernet), a wide area network (e.g. the Internet and/or World Wide Web), a telephone network (e.g., analog, digital, wired, wireless, PSTN, ISDN, GSM, GPRS, and/or XDSL), a packet-switched network, a radio network, a television network, a cable network, a satellite network, and/or any other wired or wireless communications network configured to carry data. The network 14 may include elements, such as, for example, intermediate nodes, proxy servers, routers, switches, and adapters configured to direct and/or deliver data. For purposes of simplicity, only one network 14 is shown in FIG. 6. However, it is understood that the system 10 may be connected to any number of networks 14.

The system 10 includes a computing device 16 in communication with the imaging system 12. The computing device 16 may be embodied as any suitable type of computing device. The computing device 16 includes a contour modeling module 18 configured for superimposing reference anchors on a first cross-sectional image generated from 3D image data, for generating a line which connects the reference anchors, for sampling the 3D image data in a variable thickness plane defined by the connecting line, and for generating a contour-modeled C-mode image from the sampled 3D image data. For purposes of simplicity, only one computing device 16 is shown in FIG. 6. However, it will be appreciated that the system 10 may include any number of computing devices 16.

The contour modeling module 18 may be implemented in either hardware, firmware, software or combinations thereof. For embodiments utilizing software, the software may utilize any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The contour modeling module 18 (e.g., software application, computer program) may be stored on computer-readable medium in communication with the computing device 16 such that when the mediums are read, the functions described herein are performed.

According to various embodiments, the contour modeling module 18 may reside at the computing device 16, at other devices within the system 10, or combinations thereof. For embodiments where the system 10 includes more than one computing device 16, the contour modeling module 18 may be distributed across a plurality of computing devices 16.

As shown in FIG. 6, the system 10 may also be communicably connected to a display device 20. The display device 20 may be any suitable type of display device, and is configured for displaying one or more images generated from the 3D image data. For example, the display device 20 may be configured to display a C-mode image generated from the 3D image data (e.g., a C-mode image of a human eye), a horizontal cross-sectional image generated from the 3D image data (e.g., a horizontal cross-section associated with a human eye), a vertical cross-sectional image generated from the 3D image data (e.g., a vertical cross-section associated with a human eye), etc. In general, the display device 20 is configured to display the images in any suitable arrangement. For example, according to various embodiments, a single image may be displayed on the display device 20. According to other embodiments, a C-mode image may be displayed on the "left" side of the display device 20 and a cross-sectional image may be displayed on the "right" side of the display device 20. Thus, it is understood that the display device 20 may display images in a variety of different arrangements.

For purposes of simplicity, only one display device 20 is shown in FIG. 6. However, it is understood that the system 10 may include any number of display devices 20. For example, according to various embodiments, the system 10 may include two display devices 20—one for displaying the C-mode images and the other for displaying the cross-sectional images.

Figure 7:
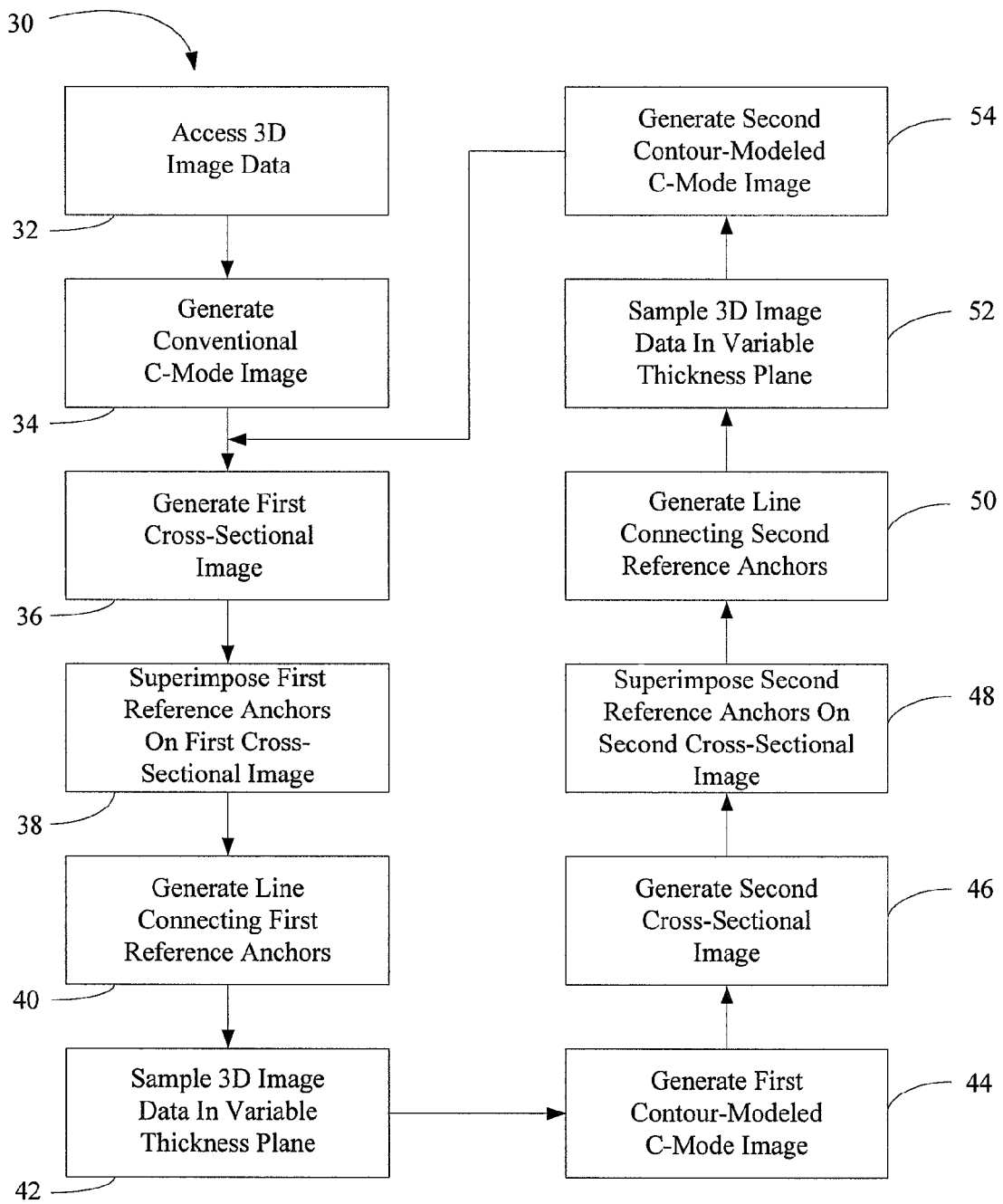
FIG. 7 illustrates various embodiments of a method for visualizing a structure of interest.

FIG. 7 illustrates various embodiments of a method 30 for visualizing a structure of interest. The structure of interest may any type of structure of interest (e.g., striation of retinal nerve fibers, a retinal capillary network, a choroidal capillary network, major choroidal vasculatures, etc.). The method 30 may be implemented by the system 10 of FIG. 6. For purposes of simplicity, the method 30 will be described in the context of the system 10 of FIG. 6, where the structure of interest is associated with a human eye.

Prior to the start of the process 30, a structure of interest is chosen, and a SD-OCT system is utilized to perform a scan on a human eye. The scan is typically performed in a lateral direction (e.g., "x" direction) and a vertical direction (e.g., "y" direction). In general, the scan rate for the lateral direction may be in the range of approximately two-hundred to one-thousand times faster than the scan rate for the vertical direction. Based on raw data acquired during the scan, the SD-OCT system generates 3D image data. As explained previously, due to the natural curvature of the human eye and to movement of the eye during the scanning process, in many instances the raw data, and the corresponding 3D image data, is somewhat distorted. Understandably, due to the disparity in the scan rates, the 3D image data tends to more distorted in the vertical direction than in the horizontal direction. The 3D image data may be stored at the imaging system 12.

The process 30 starts at block 32, where a user prompts the system 10 to access the 3D image data stored at the imaging system 12. The user may prompt the system 10 in any suitable manner, and the system 10 may access the 3D image data in any suitable manner. For example, the system 10 may receive a "copy" of the 3D image data.

Figure 8:
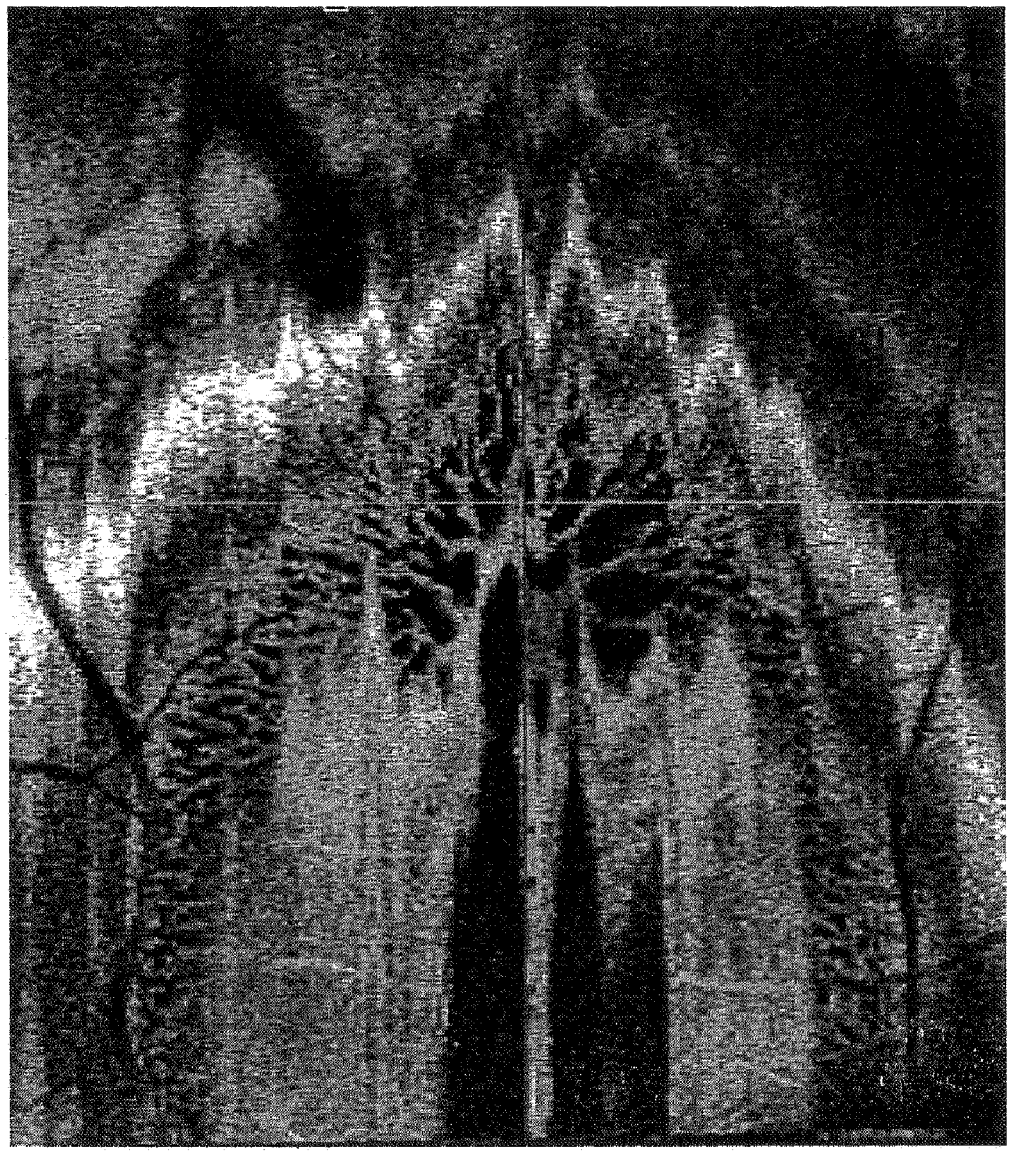
FIG. 8 illustrates a conventional C-mode image generated by the method of FIG. 7.

From block 32, the process advances to block 34, where a user prompts the system 10 to generate a conventional C-mode image from the 3D image data. The user may prompt the system 10 in any suitable manner. The prompt to generate the conventional C-mode image is a prompt to generate a conventional C-mode image which shows the chosen structure of interest. The generated conventional C-mode image is displayed on the display device 20. An example of a conventional C-mode image generated at block 34 is shown in FIG. 8. According to various embodiments, the system 10 may automatically superimpose a user movable horizontal line and a user movable vertical line on the conventional C-mode image.

From block 34, the process advances to block 36, where the user prompts the system 10 to generate a first cross-sectional image from the 3D image data. The user may prompt the system 10 in any suitable manner. For example, the user may prompt the system 10 by using a mouse or other pointing device connected to the computing device 16 to select the user movable horizontal line which is superimposed on the conventional C-mode image. The selection of the user movable horizontal line prompts the system 10 to generate a horizontal cross-sectional image which corresponds to the position of the user movable horizontal line. Alternatively, the user may prompt the system 10 by using the mouse or other pointing device to select the user movable vertical line which is superimposed on the conventional C-mode image. The selection of the user movable vertical line prompts the system 10 to generate a vertical cross-sectional image which corresponds to the position of the user movable vertical line.

Figure 9:
FIG. 9 illustrates a horizontal cross-sectional image generated by the method of FIG. 7.

Although the first cross-sectional image can be a horizontal cross-sectional image or a vertical cross-sectional image, for purposes of simplicity, the description will proceed as if the horizontal cross-section was selected. The generated horizontal cross-sectional image is displayed on the display device 20. An example of a horizontal cross-sectional image generated at block 36 is shown in FIG. 9. According to various embodiments, the system 10 may automatically superimpose user movable reference anchors, and a line connecting the user movable references, on the horizontal cross-sectional image. The user movable reference anchors are shown as square boxes in FIG. 9.

From block 36, the process advances to block 38, where the user utilizes the mouse or other pointing device to move one or more of the user movable reference anchors on the horizontal cross-sectional image, to superimpose one or more additional user movable reference anchors on the horizontal cross-sectional image, or a combination of both. In general, the reference anchors are positioned at various locations which correspond to the structure of interest. Any number of reference anchors may be superimposed on the horizontal cross-sectional image.

Figure 10:
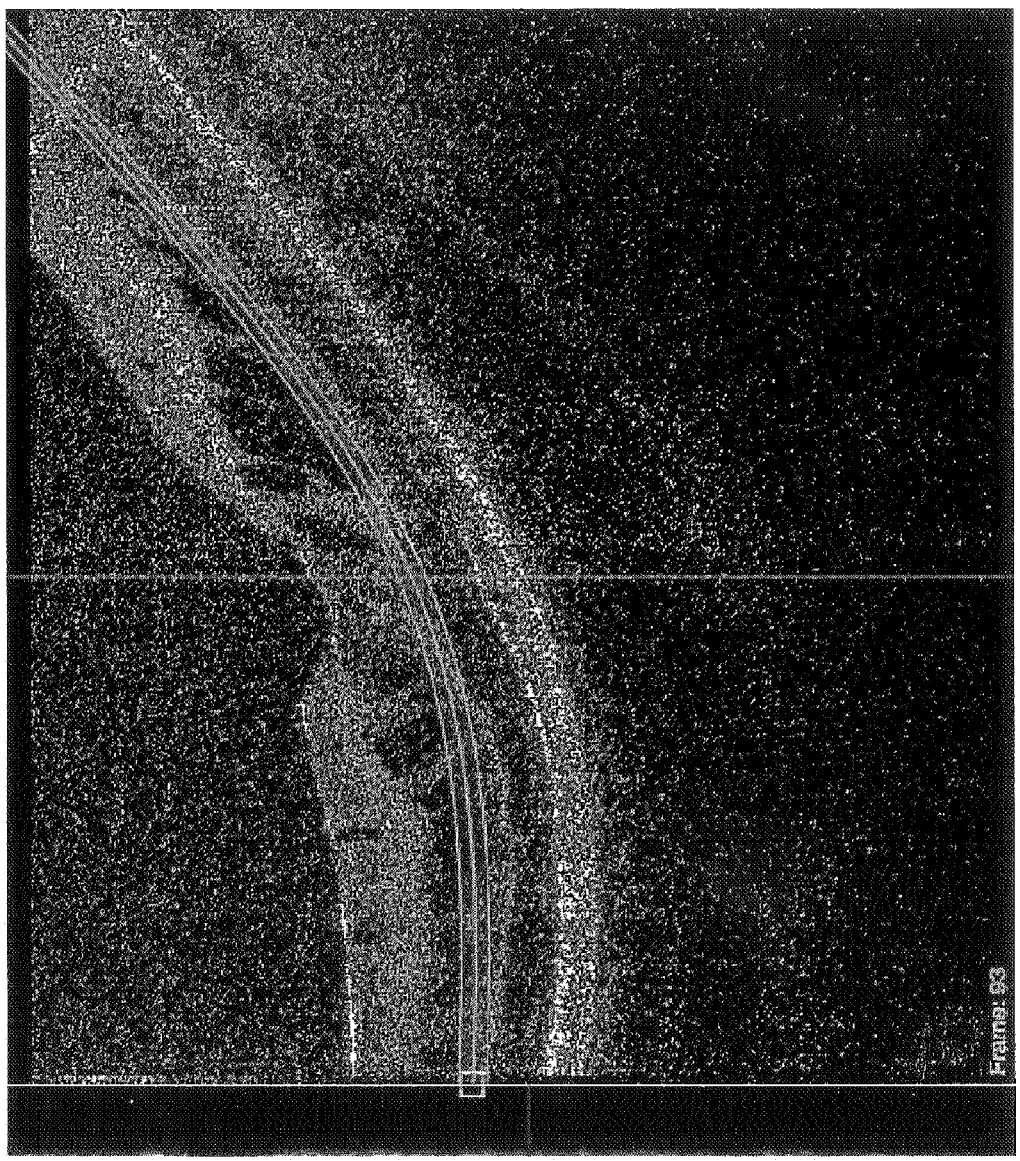
FIG. 10 illustrates user movable reference anchors and a line connecting them superimposed on a horizontal cross-sectional image generated by the method of FIG. 7.

From block 38, the process advances to block 40, where the system 10 generates a line which connects all of the user movable reference anchors which are superimposed on the horizontal cross-sectional image. The connecting line may be generated in any suitable manner. According to various embodiments, the system 10 employs cubic spline interpolation to generate the connecting line. An example of repositioned user movable reference anchors and the line connecting them is shown in FIG. 10. Although the connecting line is shown as three separate lines in FIG. 10, it is understood that the connecting line can be shown as a single thicker line, as two lines (e.g., the "uppermost" line and the "lowermost" line of FIG. 10), as four lines, etc. As shown, the user movable anchors are positioned such that the line connecting them follows the contour of a structure of interest.

Figure 11:
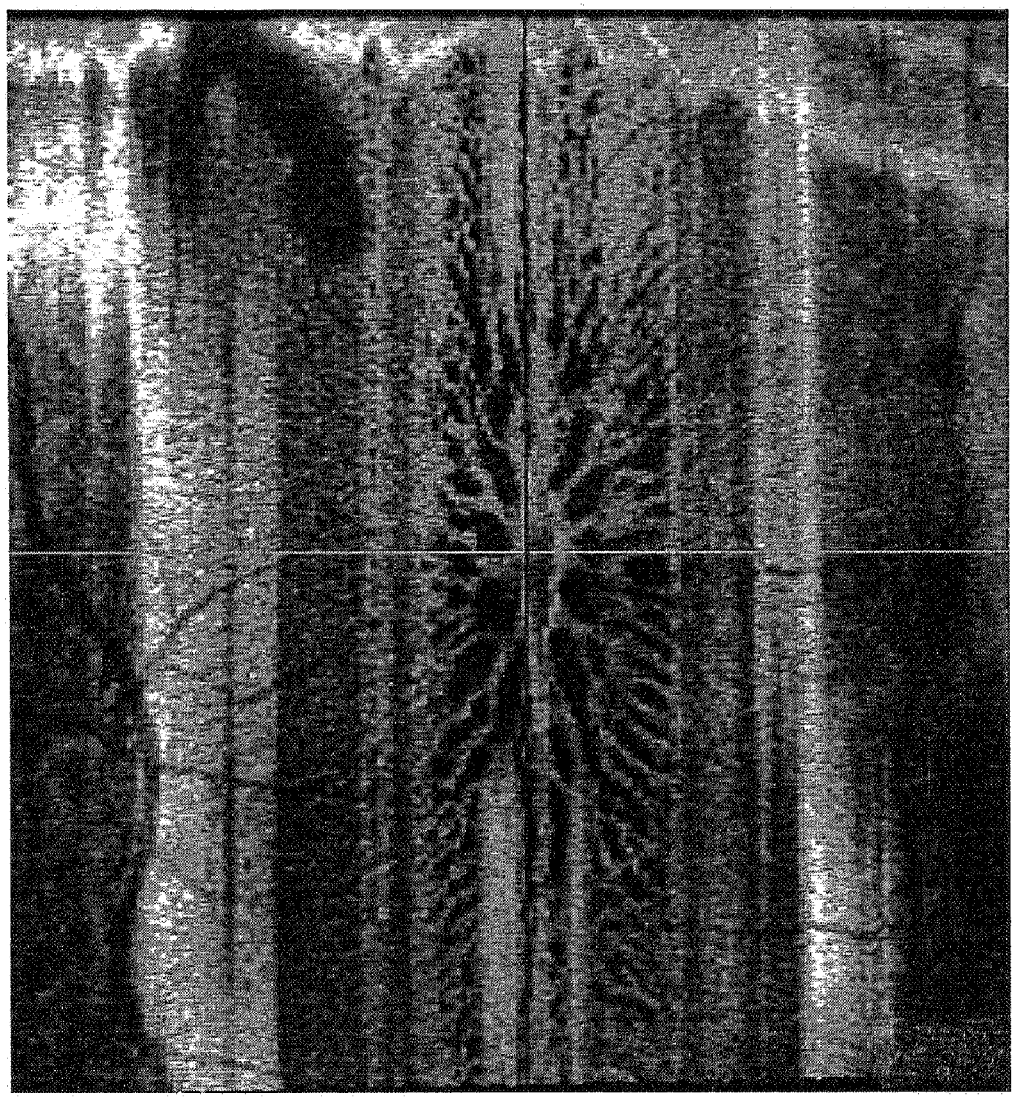
FIG. 11 illustrates a contour-modeled C-mode image generated by the method of FIG. 7.

From block 40, the process advances to block 42, where the system 10 samples the 3D image data in a variable thickness plane defined by the connecting line. From block 42, the process advances to block 44, where the system 10 generates a contour modeled C-mode image from the 3D image data sampled at block 42. The contour-modeled C-mode image is displayed on the display device 20. An example of a contour-modeled C-mode image generated at block 44 is shown in FIG. 11. According to various embodiments, the system 10 may automatically superimpose a user movable horizontal line and a user movable vertical line on the contour-modeled C-mode image. According to various embodiments, the processes described at blocks 38-44 occurs in real-time. Thus, when another user movable reference anchor is added at block 38, the contour-modeled C-mode image at block 44 is changed accordingly in real-time.

From block 44, the process advances to block 46, where the user prompts the system 10 to generate a second cross-sectional image from the 3D image data. In general, when the first cross-sectional image is a horizontal cross-sectional image, the second cross-sectional image is a vertical cross-sectional image. The user may prompt the system 10 in any suitable manner. For example, the user may prompt the system 10 by using a mouse or other pointing device connected to the computing device 16 to select the user movable vertical line which is superimposed on the contour-modeled C-mode image. The selection of the user movable vertical line prompts the system 10 to generate a vertical cross-sectional image which corresponds to the position of the user movable vertical line.

Figure 12:
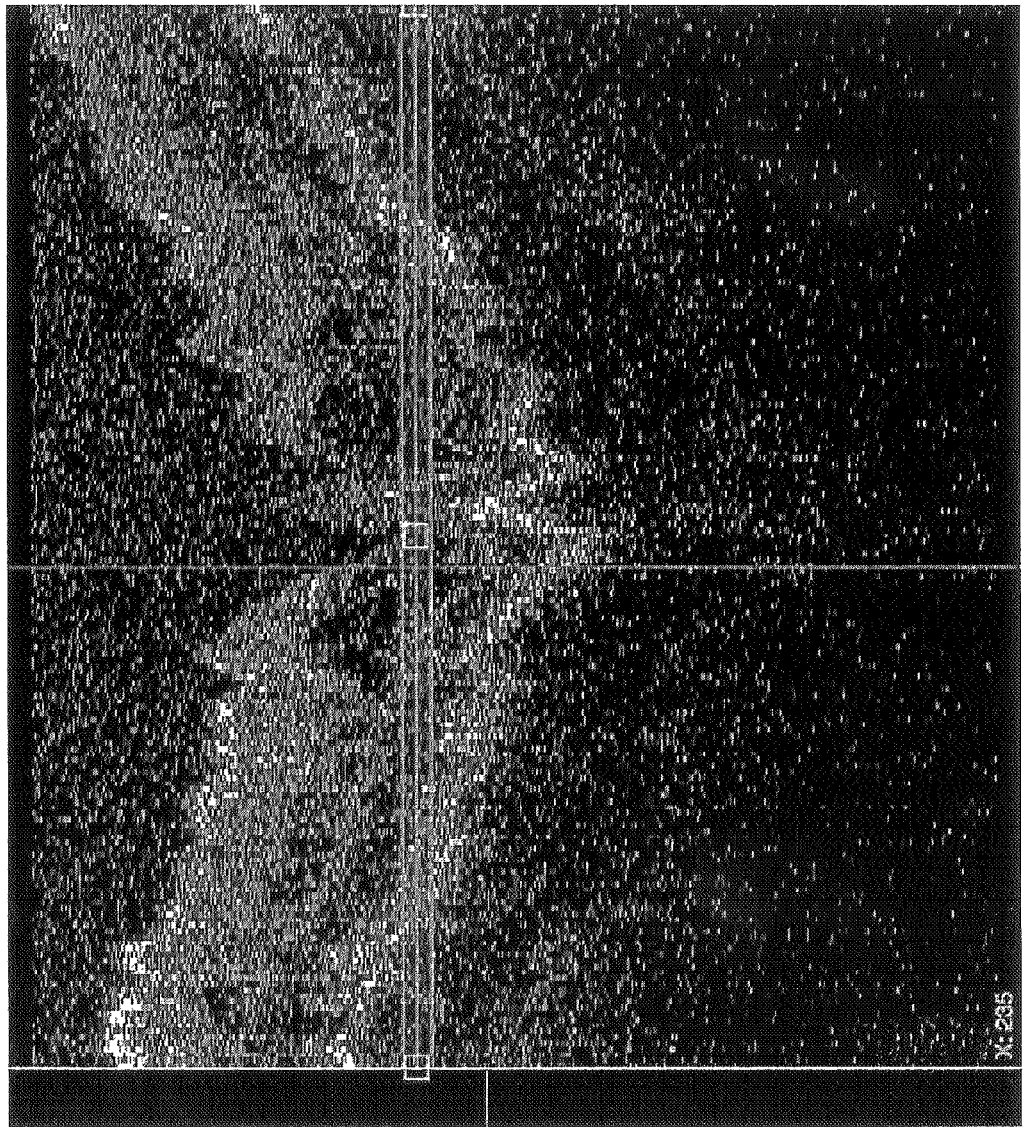
FIG. 12 illustrates a vertical cross-sectional image generated by the method of FIG. 7.

The generated vertical cross-sectional image is displayed on the display device 20. An example of a vertical cross-sectional image generated at block 46 is shown in FIG. 12. According to various embodiments, the system 10 may automatically superimpose user movable reference anchors, and a line connecting the user movable references, on the vertical cross-sectional image. The user movable reference anchors are shown as square boxes in FIG. 12.

From block 46, the process advances to block 48, where the user utilizes the mouse or other pointing device to move one or more of the user movable reference anchors on the vertical cross-sectional image, to superimpose one or more additional user movable reference anchors on the vertical cross-sectional image, or a combination of both. In general, the reference anchors are positioned at various locations which correspond to the structure of interest. Any number of reference anchors may be superimposed on the vertical cross-sectional image.

Figure 13:
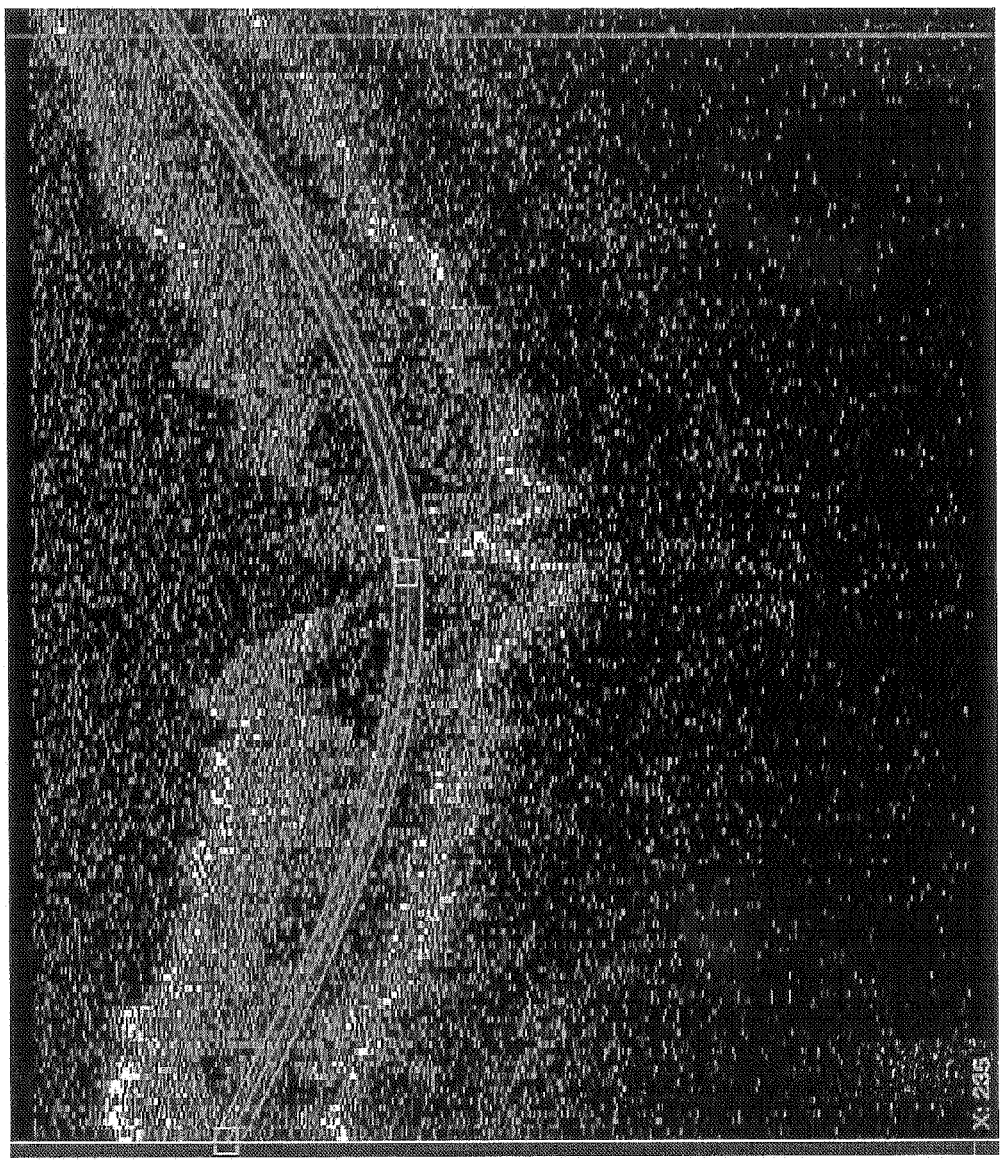
FIG. 13 illustrates user movable reference anchors and a line connecting them superimposed on a vertical cross-sectional image generated by the method of FIG. 7.

From block 48, the process advances to block 50, where the system 10 generates a line which connects all of the user movable reference anchors which are superimposed on the vertical cross-sectional image. The connecting line may be generated in any suitable manner. According to various embodiments, the system 10 employs cubic spline interpolation to generate the connecting line. An example of repositioned user movable reference anchors and the line connecting them is shown in FIG. 13. Although the connecting line is shown as three separate lines in FIG. 13, it is understood that the connecting line can be shown as a single thicker line, as two lines (e.g., the "uppermost" line and the "lowermost" line of FIG. 13), as four lines, etc. As shown, the user movable anchors are positioned such that the line connecting them follows the contour of a structure of interest.

Figure 14:
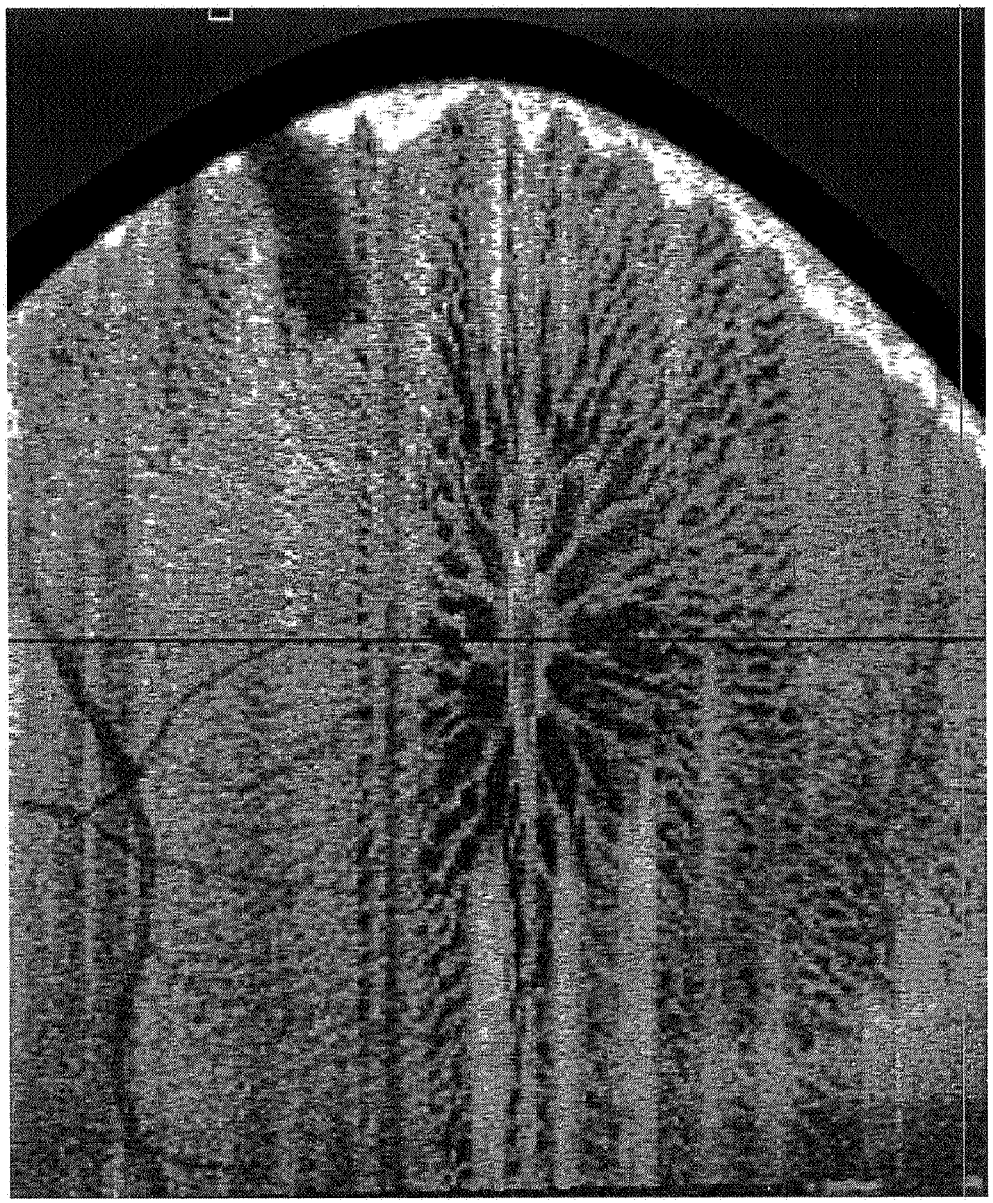
FIG. 14 illustrates a contour-modeled C-mode image generated by the method of FIG. 7.

From block 50, the process advances to block 52, where the system 10 samples the 3D image data in a variable thickness plane defined by the connecting line generated at block 50. From block 52, the process advances to block 54, where the system 10 generates a second contour modeled C-mode image from the 3D image data sampled at block 52. The second contour-modeled C-mode image is displayed on the display device 20. An example of a contour-modeled C-mode image generated at block 54 is shown in FIG. 14. According to various embodiments, the system 10 may automatically superimpose a user movable horizontal line and a user movable vertical line on the second contour-modeled C-mode image. According to various embodiments, the processes described at blocks 48-54 occurs in real-time. Thus, when another user movable reference anchor is added at block 48, the contour-modeled C-mode image at block 54 is changed accordingly in real-time.

Figure 15:
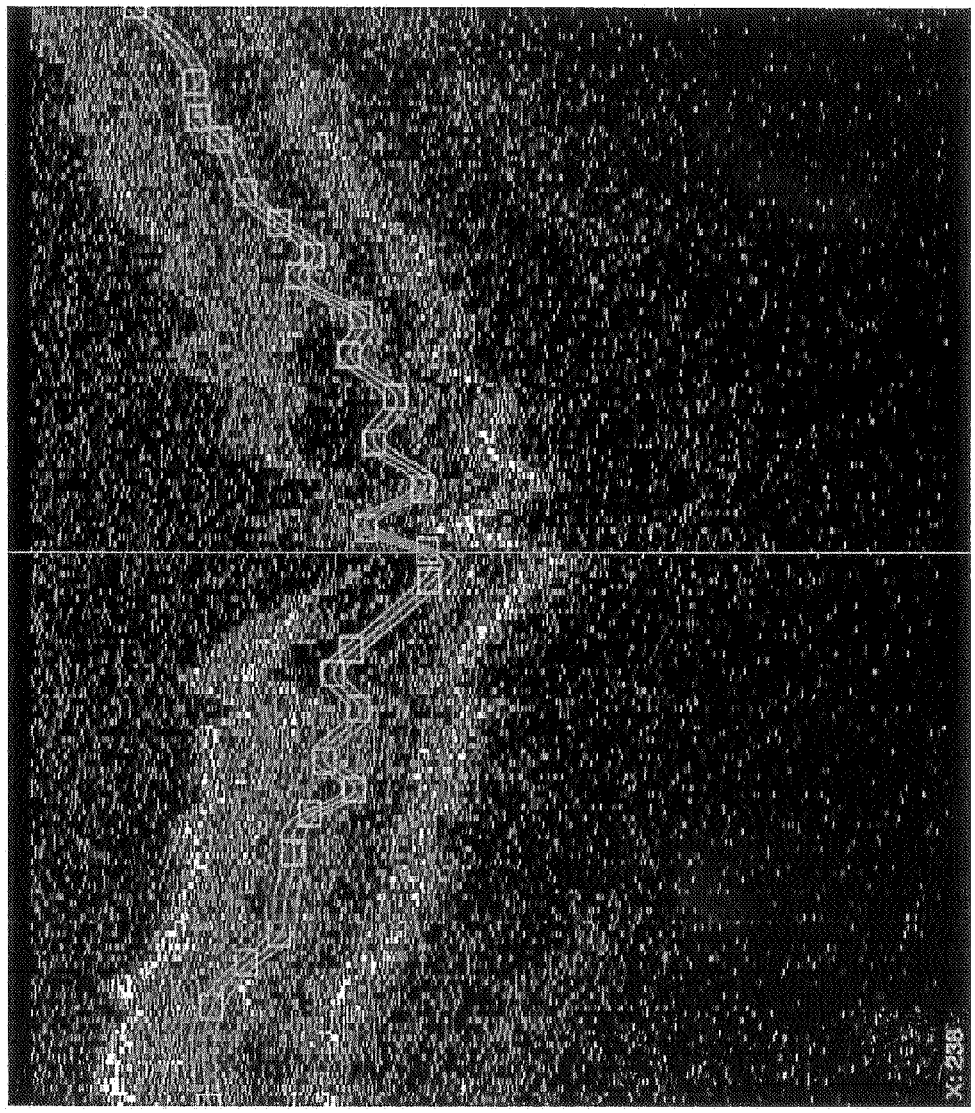
FIG. 15 illustrates a final vertical cross-sectional image generated by the method of FIG. 7.
Figure 16:
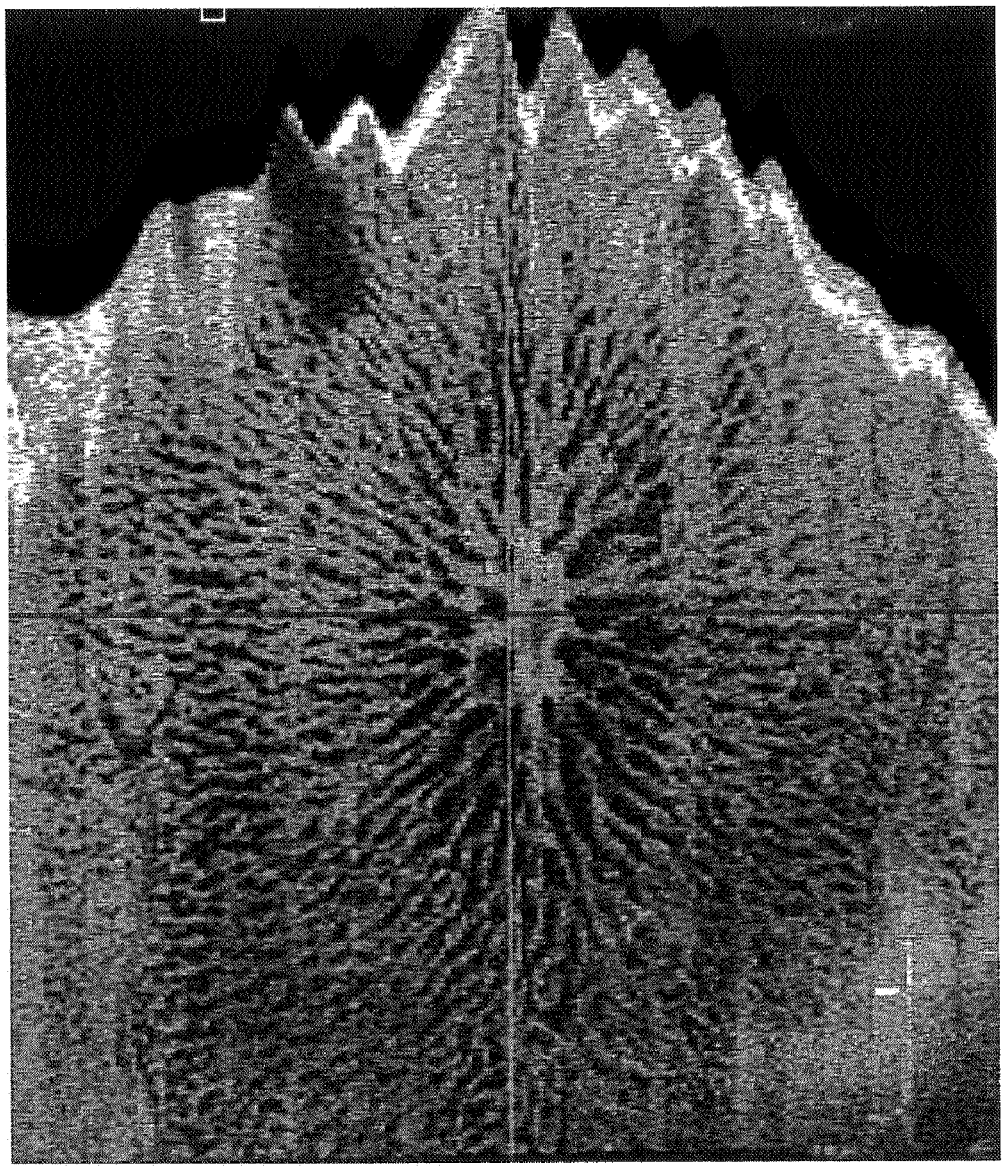
FIG. 16 illustrates a final contour-modeled C-mode image generated by the method of FIG. 7.

If the second contour model C-mode image is satisfactory, the method 30 ends after the completion of the actions taken at block 54. However, if the second contour-modeled C-mode image is not satisfactory, the process returns from block 54 to block 36, where the process advances as described hereinabove. The sequence from block 36 to block 54 may be repeated any number of times until a given contour-modeled C-mode image is satisfactory. An example of a final vertical cross-sectional image generated after a number of iterations is shown in FIG. 15. As shown, the number of superimposed reference anchors is significantly more than the initial three superimposed reference anchors of FIG. 13, and the contour is much more complex. An example of a corresponding final contour-modeled C-mode image is shown in FIG. 16.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A system, comprising:
    a computing device configured for communication with an imaging system and a display device, wherein the computing device comprises:

a contour modeling module, wherein the contour modeling module is configured for:
- superimposing first reference anchors on a first cross-sectional image generated from 3D image data;
- generating a first line which connects the first reference anchors;
- sampling first 3D image data in a first variable thickness plane defined by a length of the first connecting line, wherein the length of the first connecting line defines an edge of the first variable thickness plane; and
- generating a first contour-modeled C-mode image from the sampled first 3D image data.

2. The system of claim 1, wherein the contour modeling module is further configured to generate a second cross-sectional image from the 3D image data.

3. The system of claim 2, wherein the second cross-sectional image is perpendicular to the first cross-sectional image.

4. The system of claim 1, wherein the contour modeling module is further configured for:
- superimposing second reference anchors on a second cross-sectional image generated from the 3D image data;
- generating a second line which connects the second reference anchors;
- sampling second 3D image data in a second variable thickness plane defined by a length of the second connecting line, wherein the length of the second connecting line defines an edge of the second variable thickness plane; and
- generating a second contour-modeled C-mode image from the sampled second 3D image data.

5. The system of claim 4, wherein the second cross-sectional image is perpendicular to the first cross-sectional image.

6. The system of claim 1, wherein the computing device comprises a portion of the imaging system.

7. The system of claim 1, wherein the first variable thickness plane is defined by an entire length of the first connecting line.

8. A method, implemented at least in part by a computing device, the method comprising:
- superimposing first reference anchors on a first cross-sectional image generated from 3D image data;
- generating a first line which connects the first reference anchors;
- sampling first 3D image data in a first variable thickness plane defined by a length of the first connecting line, wherein the length of the first connecting line defines an edge of the first variable thickness plane; and
- generating a first contour-modeled C-mode image from the sampled first 3D image data.

9. The method of claim 8, wherein superimposing first reference anchors comprises superimposing user movable first reference anchors.

10. The method of claim 8, wherein generating the first line comprises performing cubic spline interpolation.

11. The method of claim 8, further comprising generating a second cross-sectional image from the 3D image data.

12. The method of claim 11, wherein generating the second cross-sectional image comprises generating a second cross-sectional image which is perpendicular to the first cross-sectional image.

13. The method of claim 8, further comprising:
- superimposing second reference anchors on a second cross-sectional image generated from the 3D image data;
- generating a second line which connects the second reference anchors;
- sampling second 3D image data in a second variable thickness plane defined by a length of the second connecting line, wherein the second connecting line defines an edge of the second variable thickness plane; and
- generating a second contour-modeled C-mode image from the sampled second 3D image data.

14. The method of claim 13, further comprising superimposing at least one additional reference anchor on at least one of the following:
- the first cross-sectional image; and
- the second cross-sectional image.

15. The method of claim 13, wherein superimposing the second reference anchors comprises superimposing the second reference anchors on a second cross-sectional image which is perpendicular to the first cross-sectional image.

16. The method of claim 13, wherein sampling the second 3D image data comprises sampling the second 3D image data in a second variable thickness plane defined by an entire length of the second connecting line.

17. The method of claim 8, wherein sampling the first 3D image data comprises sampling the first 3D image data in a first variable thickness plane defined by an entire length of the first connecting line.

\* \* \* \* \*